United States Patent [19]

Zimmerman et al.

[11] Patent Number: 4,787,043

[45] Date of Patent: Nov. 22, 1988

[54] METHOD OF MEASURING BAROMETRIC PRESSURE AND MANIFOLD ABSOLUTE PRESSURE USING A SINGLE SENSOR

[75] Inventors: Eugene S. Zimmerman, Brownstown; Larry R. Hartwick, Auburn Heights, both of Mich.

[73] Assignee: Chrysler Motors Corporation, Highland Park, Mich.

[21] Appl. No.: 922,779

[22] Filed: Oct. 28, 1986

Related U.S. Application Data

[63] Continuation of Ser. No. 647,084, Sep. 4, 1984, abandoned.

[51] Int. Cl.[4] ........................ F02D 35/00; F02D 41/26; G01L 23/24

[52] U.S. Cl. ................................ 364/431.05; 123/412; 123/480; 73/115; 364/558

[58] Field of Search ...................... 364/431.03, 431.05, 364/431.10, 558; 123/478, 480, 494, 412; 73/115, 116

[56] References Cited

U.S. PATENT DOCUMENTS

| | | | |
|---|---|---|---|
| 4,165,650 | 8/1979 | Weissler, II | 73/115 |
| 4,235,204 | 11/1980 | Rice | 364/431.05 |
| 4,245,604 | 1/1981 | Lahiff | 123/478 |
| 4,388,825 | 6/1983 | de Valpillieres | 73/115 |
| 4,416,239 | 11/1983 | Takase et al. | 123/494 |
| 4,475,381 | 10/1984 | Nakatomi et al. | 73/115 |
| 4,476,532 | 10/1984 | Akiyana et al. | 364/431.05 |
| 4,556,943 | 12/1985 | Pauwels et al. | 123/480 |
| 4,600,993 | 7/1986 | Pauwels et al. | 364/431.10 |

*Primary Examiner*—Felix D. Gruber
*Attorney, Agent, or Firm*—Mark P. Calcaterra

[57] ABSTRACT

A method for reading the barometric pressure surrounding a vehicle and manifold absolute pressure from an engine utilizing a manifold absolute pressure sensor and a solenoid to vent the sensor to atmosphere as controlled by an electronic control system for an engine to measure the barometric pressure and to vent the sensor to manifold pressure to measure the manifold absolute pressure.

1 Claim, 2 Drawing Sheets

(*Any fixed throttle position or any fixed MAP reading can be used)

METHOD OF MEASURING BAROMETRIC PRESSURE AND MANIFOLD ABSOLUTE PRESSURE USING A SINGLE SENSOR

This application is a continuation of Ser. No. 647,084 filed Sept. 4, 1984, now abandoned.

BACKGROUND AND SUMMARY OF THE INVENTION

In electronically controlled engine systems, a parameter which is often needed for computation purposes in the control systems computer is the barometric pressure. A common way to sense the barometric pressure would be to purchase a sensor dedicated for the purpose of reading barometric pressure. This is a rather expensive means to obtain the desired result. It complicates the system design with additional wiring and expense, as well as tying up the use of an additional input channel to the computer.

The subject disclosure provides a technique to read barometric pressure utilizing an existing sensor employed for the purpose of reading manifold absolute pressure (MAP). The sensor works in tandem with the electronic control system's computer and an inexpensive solenoid to provide the electronic control system both with MAP reading and with barometric pressure readings to keep the engine running smoothly.

It is, therefore, an object of this invention to utilize a single MAP sensor to measure barometric pressure and to measure MAP.

DESCRIPTION OF THE DRAWINGS

Other objects, features and advantages of the present invention will become more fully apparent from the following detailed description of the preferred embodiment, the appended claims and in the accompanying drawing in which:

DETAILED DESCRIPTION OF THE PREFERRED EMBODIMENT

The technique described herein is useful in an engine's electronic control system and is particularly useful in any control system employing a computer and the process of measuring the barometric pressure utilizing an already existing pressure sensor. In other words, this technique allows a control system to utilize one pressure sensor instead of two by multiplexing the process of measurement.

Figure 1:
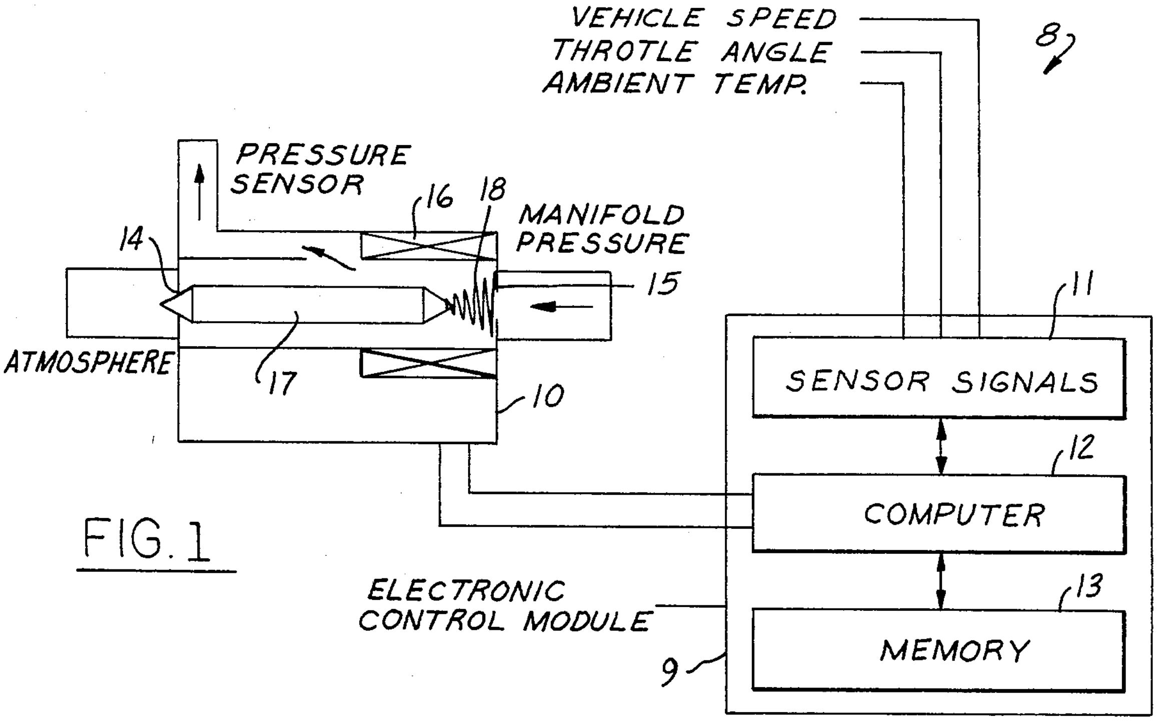
FIG. 1 is a schematic view of an apparatus for carrying out the present invention and having a first position to read manifold pressure.
Figure 2:
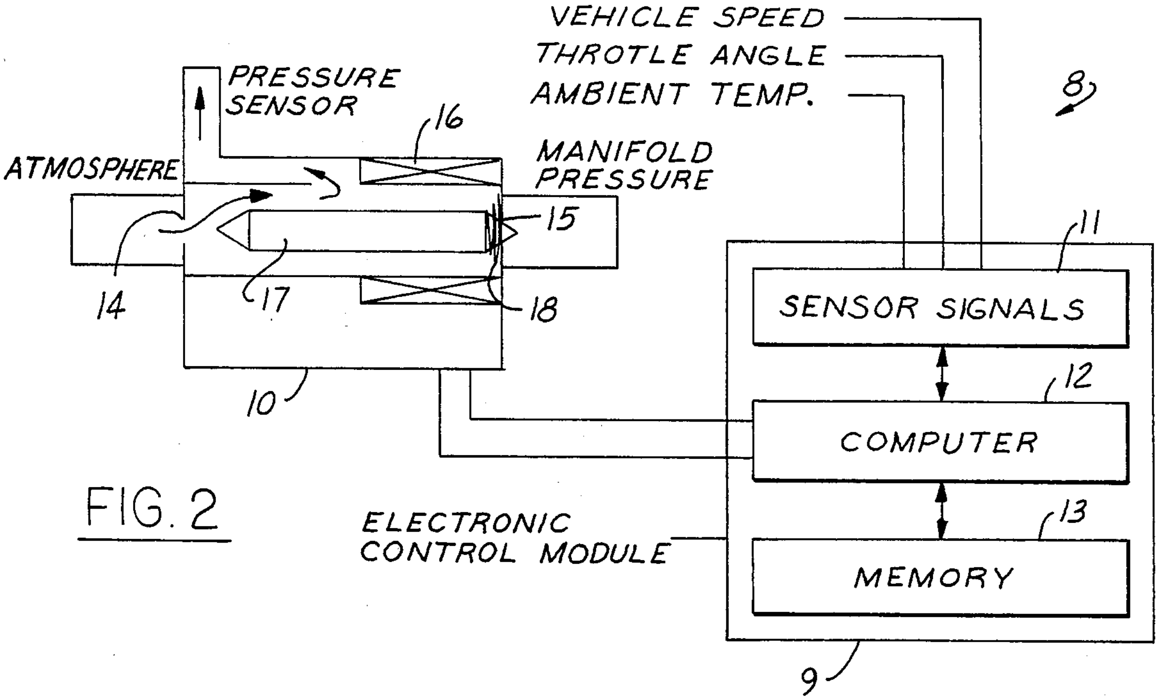
FIG. 2 is a schematic view of the apparatus of FIG. 1 having a second position to read barometric pressure.

Referring to FIGS. 1 and 2, a system of apparatus 8 for carrying out a barometric pressure read technique or control strategy to be described is shown. The apparatus 8 comprises an electronic control module (ECM) 9 connected to a manifold absolute pressure (MAP) sensor 10. The ECM 9 includes a sensor signals portion 11 receiving data values of conditions such as vehicle speed, throttle angle and ambient temperature from input sensors or transducers (not shown). The ECM 9 also includes a computer 12 for utilizing the data values along with the predetermined control strategy to control the engine. The ECM 9 further includes memory 13 for storing the data values representing the various engine and vehicle parameters, as well as for storing the predetermined control strategy.

The MAP sensor 10 includes one aperture 14 communicating with the atmosphere and another aperture 15 communicating with manifold pressure from the engine. A solenoid 16 includes a valve 17 moveable to open the aperture 14 and close the aperture 15 when the solenoid 16 is energized by the ECM 9 to vent the MAP sensor 14 to atmosphere as shown in FIG. 2. When the solenoid 16 is de-energized by the ECM 9, a spring 18 returns the valve 17 to close the aperture 14 and open the aperture 15 to vent the MAP sensor 10 to manifold pressure as shown in FIG. 1.

Figure 3:
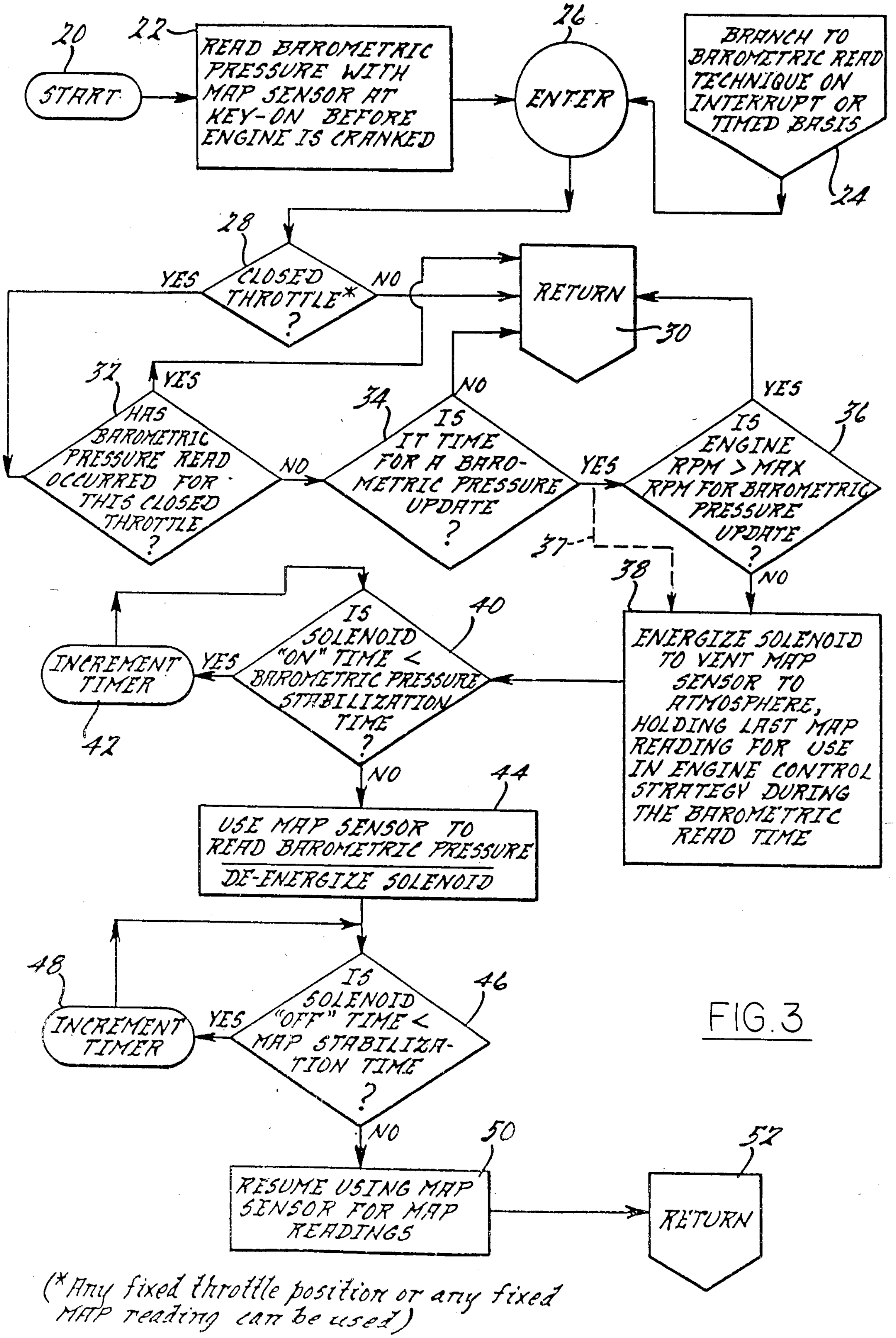
FIG. 3 is a flowchart which illustrates the steps involved in the subject barometric pressure read technique.

Referring to FIG. 3, the technique is entered at bubble 20 and if the vehicle is just being started, the barometric pressure is read with the manifold absolute pressure (MAP) sensor 10 prior to the beginning of the engine crank cycle. This is done when the key is turned on, but before the engine is actually cranked.

If the engine has already been running, the barometric pressure reading may need to be updated either periodically or on an interrupt basis. This possibility is accounted for in block 24 which allows the control strategy stored in the computer 12 to branch to this barometric reading technique when required and enter the technique via bubble 26. Regardless of how the technique is entered, either via block 22 or block 24, the technique proceeds identically thereafter.

Proceeding now to decision block 28, the system determines whether the throttle on the engine is closed. If it is open, the barometric pressure read technique releases the computer 12 to return to the control strategy and handle the tasks via return block 30. If the throttle is closed, decision block 32 is entered to determine if a barometric pressure reading has already occurred for this particular closed throttle condition. Note that any fixed throttle position can be used in place of closed throttle. If such a reading has taken place, the barometric pressure read technique releases the computer 12 to return to other segments of the overall control strategy via block 30.

If the barometric pressure has not been read during this particular closed throttle, decision block 34 is entered to determine whether there has been sufficient time elapsed since the last barometric pressure update. The choice of this time period is a function of many considerations and can, therefore, be called a design choice.

The primary consideration for time interval selection is the maximum expected rate of elevation and barometer change. Also the system's tolerance to using an inaccurate barometer value must be considered. A greatly tolerant system operating at relatively consistent elevation would not need a short time interval, for example. Finally, activation must be at a frequency for maximum solenoid life.

If it is not time for a barometric pressure update, the barometric pressure read technique releases the computer 12 to return to various other segments of the control strategy via block 30. If it is time for barometric pressure update, the technique proceeds to decision block 36 to determine whether the engine RPM is greater than the maximum allowable RPM determined for barometric pressure update. If the engine RPM is above the maximum, the technique releases the computer 12 to return to the control strategy via block 30. If the engine speed is below the maximum, the update is now attempted in block 38. It should be noted that the decision made in block 36 could also be made using vehicle speed instead of engine speed (RPM). This is a function of many items and is, therefore, a design choice. In addition, the use of RPM or engine speed is a supportive decision point to that of closed throttle. Therefore, the use of one or two of these parameters for the decision point is a design choice. Alternate path 37 is shown in the figure to illustrate the possibility of utilizing only the closed (or any fixed) throttle position as the decision point. The RPM determination point can include all normal engine operating speeds, thereby not making RPM a determining factor.

Although closed throttle is used as a requirement for a barometric pressure read, any fixed throttle position could conceivably be used. This is especially true if the stabilization times are very short. This is shown in block 28.

In place of a fixed throttle position technique, a fixed manifold absolute pressure technique is also practical. That is, use the barometer read technique when the manifold absolute pressure is at some predetermined level. This is more likely to be useful when stabilization times are short. This is also shown in block 28.

To update the barometric pressure reading, the last manifold absolute pressure (MAP) reading is retained in memory 13 of the computer 12 for the duration of this update technique. The purpose of this retention, even though of short duration, is that a MAP reading may be required at a frequency less than the time required to update the barometric pressure. This becomes critical since we are using the MAP sensor 10 to generate MAP data and barometric pressure data. Since the last MAP reading is now held in memory 13, the solenoid 16 connected to the MAP sensor 10 is energized to vent the MAP sensor to atmosphere. This is also noted in block 38.

Thereafter, decision block 40 is entered to monitor the "on" time of the solenoid 16. A predetermined amount of time is required in order to take the barometric pressure reading. This time is entitled the barometric pressure stabilization time determined by the pneumatic lag times of a specific system. If the solenoid "on" time is less than the barometric pressure stabilization time, a timer is incremented in bubble 42 and decision block 40 is re-entered. Once the solenoid "on" time is equal to or greater than the barometric pressure stabilization time, the technique continues to block 44 where the MAP sensor 10 is now employed to take a reading of the barometric pressure. Once the pressure is read, the solenoid 16 is de-energized.

Stabilization time is also important with respect to MAP. Therefore, decision block 46 is entered to determine whether the solenoid "off" time is less than the MAP stabilization time. If it is, the timer is incremented in bubble 48 and decision block 46 is re-entered. Once the solenoid "off" time equals or exceeds the MAP stabilization time, the technique proceeds to block 50 and the MAP sensor 10 is released to generate MAP readings. The technique now releases the computer 12 to handle all the segments of the control strategy in block 52.

While the present invention has been disclosed in connection with the preferred embodiment thereof, it should be understood that there may be other embodiments which fall within the spirit and scope of the invention, and that the invention is susceptible to modification, variation and change without departing from the proper scope or fair meaning of the following claims:

We claim:

1. In an electronic control system for an engine, the system having sensors to monitor various engine and vehicle parameters, including manifold absolute pressure (MAP), vehicle speed and ambient temperature, the system also having memory means for storing data values representing the various engine and vehicle parameters, as well as for storing a predetermined control strategy, the system further having a solenoid to vent the MAP sensor to atmosphere, the system further having computer means for utilizing the data values along with the control strategy to control the engine, a barometric pressure read technique for utilizing the MAP sensor to measure barometric pressure dynamically while the engine is operating and for controlling the engine while the MAP sensor is dedicated to measuring the barometric pressure, comprising:

branching to the barometric pressure read technique from the control strategy;

determining whether the throttle is in a predetermined position;

returning to the engine control strategy if the throttle is at a position other than the predetermined position;

determining whether the system is due for a barometric pressure update, returning to the engine control strategy if it is not;

determining whether the actual engine RPM is greater than the maximum allowable RPM set for a barometric pressure update, returning to the engine control strategy if it is;

energizing a solenoid to vent the MAP sensor to atmosphere, holding the last MAP sensor reading for use in the engine control strategy during the following barometric read time period;

determining if the solenoid "on" time is less than the predetermined barometric pressure stabilization time, delaying until the solenoid "on" time is equal to or greater than the barometric pressure stabilization time;

utilizing the MAP sensor to read barometric pressure;

de-energizing the solenoid;

determining whether the solenoid "off" time is less than the MAP sensor's stabilization time, delaying, if needed, until the solenoid "off" time is equal to or greater than the MAP sensor stabilization time;

resuming the engine control strategy using the MAP sensor for MAP readings and the new barometric pressure reading.

* * * * *